United States Patent Office 3,754,081
Patented Aug. 21, 1973

3,754,081
PROCESS FOR THE PRODUCTION OF CHLORINE DIOXIDE, CHLORINE AND A MIXTURE OF AN ALKALI METAL SULFATE AND BISULFATE
Harold deVere Partridge, Wilson, Blaine O. Schoepfle, Snyder, Arthur C. Schulz, North Tonawanda, and Herbert J. Rosen, Yonkers, N.Y., assignors to Hooker Chemical Corporation, Niagara Falls, N.Y.
Continuation-in-part of application Ser. No. 710,648, Mar. 5, 1968. This application Sept. 17, 1970, Ser. No. 72,925
The portion of the term of the patent subsequent to Feb. 16, 1988, has been disclaimed
Int. Cl. C01d 5/02; C01b 11/02, 7/02
U.S. Cl. 423—520                10 Claims

ABSTRACT OF THE DISCLOSURE

Chlorine dioxide, chlorine and a mixture of an alkali metal sulfate and a bisulfate for use in supplying sodium and sulfur values to a cooking liquor employed in the kraft process for delignifying wood to produce a pulp suitable for bleaching is produced by the reaction of an alkali metal chlorate, an alkali metal chloride and sulfuric acid in aqueous solution by controlling the acid normality of the aqueous solution between about 4 to about 6 normal.

Related applications

Figure 1:
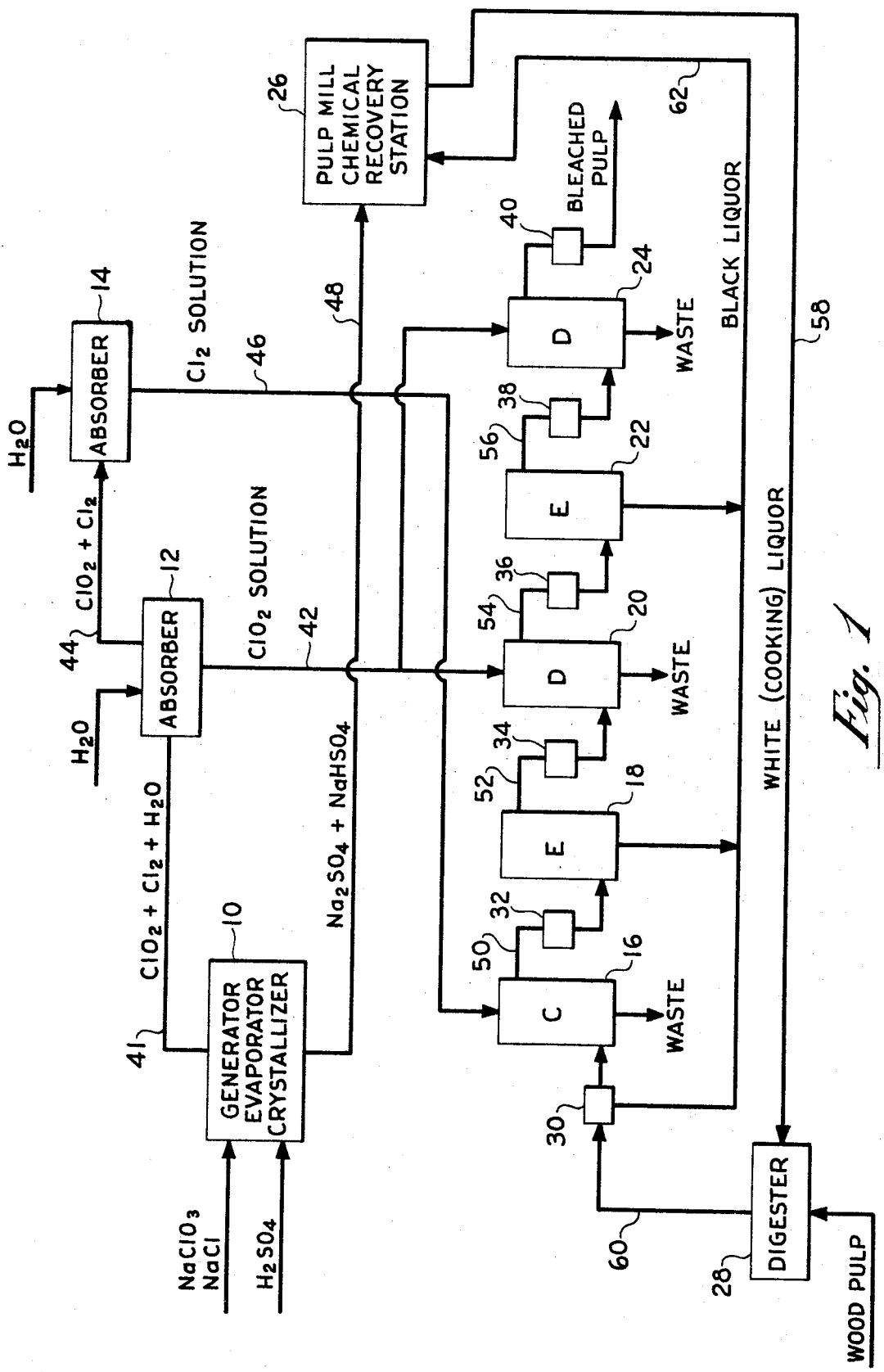

This application is a continuation-in-part of Ser. No. 710,648, now U.S. Pat. 3,563,702, filed Mar. 5, 1968.

Background of the invention

In the preparation of a bleached wood pulp by the kraft process, wood chips are treated at an elevated temperature and pressure with an aqueous solution containing, as active cooking chemicals, sodium sulfide and sodium hydroxide.

The resulting mixture of spent cooking liquor and unbleached fibers are separated and the pulp is washed with water. The spent cooking liquor and the washings are evaporated and burned, producing heat and a molten inorganic substance, commonly referred to as smelt, which is recovered, dissolved in water, treated with lime to regenerate sodium hydroxide, fortified with additional sodium and sulfur values to replace losses sustained in the process, and reused to cook more wood chips.

It is customary to use a combination of purchased sodium sulfate and the liquid effluent from a chlorine dioxide generator, which contains sodium sulfate and free sulfuric acid as the source of the sodium and sulfur required to fortify the cooking liquor.

An example of a combined chlorine dioxide generator kraft pulp bleaching process in which the use of by-product chemicals from the chlorine dioxide generator are employed in the kraft pulp bleaching process is presented in U.S. Pat. 3,366,534. The process involved in the generation of chlorine dioxide conventionally used involves the reaction of an alkali metal chlorate, an alkali metal chloride and a strong acid. The reactions which occur are exemplified below, wherein, for the sake of illustration the chlorate used is sodium chlorate, the chloride used is sodium chloride, and the strong acid used is sulfuric acid.

(1) $NaClO_3 + NaCl + H_2SO_4 \rightarrow$
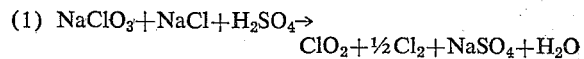
$ClO_2 + \frac{1}{2}Cl_2 + NaSO_4 + H_2O$ (2) $NaClO_3 + 5NaCl + 3H_2SO_4 \rightarrow 3Cl_2 + 3Na_2SO_4 + 3H_2O$

This reaction can be and is used on a commercial scale with the reactants continuously being fed into a reaction vessel and the chlorine and chlorine dioxide produced continuously being removed from the reaction vessel.

Reaction 1, which is the desired one inasmuch as it produces chlorine dioxide, is favored by the use of about an equimolar amount of chlorate and chloride. When about equimolar amounts of said reactants are used, the process operates very efficiently, about 95 percent or more of the sodium chlorate added being converted to chlorine dioxide. However, when about equimolar amounts of these reactants are used, the reaction mixture must be maintained at high acidity (approximately ten normal when sulfuric acid is used) in order to cause nearly all the chlorate and chloride to react so as to minimize the loss of these reactants in the effluent solution. This, however, leads to the loss of about 3.2 pounds of sulfuric acid and 2.1 pounds of sodium sulfate in the effluent solution per pound of chlorine dioxide produced.

In situations in which the effluent acid and sodium sulfate can be recovered and used usefully, this process is very economical and is widely used. For example, in kraft pulp mills where chlorine dioxide is generated by this process for bleaching the pulp, often the effluent acid is used for acidification of tall oil soap to produce tall oil. After separating of the tall oil the aqueous solution is introduced into the kraft mill chemical recovery system, thereby obtaining value for the sodium sulfate contained in the effluent solution.

In other situations where the acid value cannot be recovered in such a manner, the effluent solution may be introduced into the kraft mill chemical recovery system directly, in order to recover the value of the sodium sulfate. In some cases the acid also is valuable in helping to maintain the sulfide level in the cooking liquor. In other cases the acid is considered unnecessary and has little or no value.

Another way to recover full value from the effluent from the chlorine dioxide generator involves adding the aqueous solution of sodium chlorate and sodium chloride to the effluent liquor from a chlorine dioxide generator, plus some additional water, and cooling the mixture to approximately −15 degrees centigrade, in order to crystallize out Glauber's Salt (sodium sulfate decahydrate) in a separate crystallizing vessel in which the solution is cooled by a refrigeration unit and a heat exchanger. The crystals are separated, and the mother liquor, now containing chloric acid and hydrochloric acid, along with the excess sulfuric acid, is returned to the generator to produce more chlorine dioxide. All the water added to the system is removed by evaporation. This is accomplished by passing a stream of generator liquor through a separate evaporator unit to remove the added water and subsequently returning a concentrated stream to the generator.

Thus, the provision of an integrated chlorine dioxide generating system which utilizes fully the by-products produced during the generation of chlorine dioxide in a kraft pulp bleaching process is of a decided advantage over processes which provide materials of no value, which are discharged into the environment.

Summary of the invention

In accordance with this invention, there is provided a process for the production of chlorine dioxide and chlorine as well as a mixed sodium sulfate-bisulfate salt which comprises reacting an alkali metal chlorate, chloride and sulfuric acid in a single vessel generator-evaporator-crystallizer in the presence of a relatively small amount of a catalyst selected from the group consisting of vanadium pentoxide, silver ions, manganese ions, dichromate ions and arsenic ions.

By the expression "single vessel" applicants mean a unilocular vessel containing one chamber free from internal zoning structure within its envelope. The process steps involving the generation of $ClO_2$, $Cl_2$ and a mixture of $Na_2SO_4$ and $NaHSO_4$, the evaporation of water to maintain a substantially constant volume of reaction solution within the single vessel, and the crystallization of $Na_2SO_4$ and $NaHSO_4$, are performed simultaneously in the single, structurally zoneless reaction vessel. Thus, the reaction chamber of the single vessel process for chlorine dioxide production serves as the generator, the evaporator and the crystallizer with no provision for separation of the processing steps involved in each of these engineering operations. Each of the general process steps of generating $ClO_2$ and $Cl_2$, evaporation of water, and crystallization of a sulfate salt were formerly performed in separate vessels or in zones within a vessel.

The present invention involves a simplified process for accomplishing the three steps of generating chloride dioxide and chlorine, crystallizing from the reaction solution a mixed alkali metal, neutral and acid salt and evaporating water from the system. Thus, a balanced supply of sodium and the sulfur values for the cooking of wood pulp may be provided from a chlorine dioxide generating process which also supplies the amount of chlorine dioxide necessary for bleaching the wood cellulose in a bleaching process. What previously was performed in separate vessels or in separate zones within a vessel is now accomplished in a single, unzoned vessel. By operating this combined generator, crystallizer and evaporator under suitable vacuum, which is the preferred method of carrying out the instant invention, and by adding heat to the reaction solution, for example by means of the heat exchanger incorporated in the vessel, water is evaporated from the vessel to maintain the desired acidity and concentration of reactants while providing the secondary function of diluting the chlorine dioxide generated and thus minimizing the risk of reaching an explosive concentration of chlorine dioxide.

The sodium salts of the strong acid employed during the generation of chlorine dioxide resulting from the reaction of sulfuric acid with sodium chlorate and sodium chloride, build up in the single vessel generator-evaporator-crystallizer liquor until saturation occurs, whereupon further build up of the alkali metal salt results in the formation of a solid or crystalline salt which separates from the solution.

Generally, the reaction conditions employed in the production of chlorine dioxide are illustrated in Table 1.

Column 1 describes the preferred reaction conditions, column 2 describes the more preferred reaction conditions, and column 3 describes the most preferred reaction conditions.

TABLE 1

| Reaction conditions | 1 | 2 | 3 |
| --- | --- | --- | --- |
| Temperature, degrees centigrade | −25 to 105 | 30 to 95 | 65 to 88. |
| Pressure, millimeters Hg, absolute | 50 to 760 | 100 to 400 | 150 to 250. |
| Chlorate ion molarity | 0.2 to saturation. | 0.5 to 2.5 | 1.0 to 2.0. |
| Chloride ion molarity | do. | 0.3 to 2.5 | 0.5 to 2.0 |
| Average acid normality | 2 to 12 | 2.5 to 6 | 3 to 4. |

Applicants have discovered that with proper control of the average acidity of the reaction solution within the single vessel generator-evaporator-crystallizer, to from above 4–6 normal, and preferably from above 4 to about 5 normal, the ratio of neutral $Na_2SO_4$ to $NaHSO_4$ may be controlled to provide a mixture of neutral sodium sulfate and acid sodium sulfate such that the ratio of sodium to sulfur values for use in the kraft pulp bleaching process is optimized. The molar ratio of Na:S in the solid sulfate product removed from a single vessel generator-evaporator-crystallizer operating at about 3.0 normal acidity is about 2.0 moles Na:1.0 mole S, whereas at an acid normality of about 6.0, the molar ratio of Na:S in the salt produced is about 1.0 mole Na:1.0 mole S. The change in the ratios of Na:S are most pronounced between about 4.1 normal to 5.0 normal acidity, the ratio at 5.0 normal falling between about 70 to 80 percent acid sulfate.

By controlling the acidity of the chlorine dioxide generator-evaporator-crystallizer solution at intermediate acidities between about 4.1 and about 6.0 a wide range of Na:S ratios can be produced.

The mixture of neutral sodium sulfate and acid sodium sulfate is produced in a single vessel generator-evaporator-crystallizer, to which is fed aqueous reactant solutions comprising a mixture of an alkali metal chlorate and an alkali metal chloride, and sulfuric acid. A vacuum is applied to the liquid surface within the generator-evaporator-crystallizer to remove reaction products and water; such vacuum may be applied, e.g., by a Venturi eductor type vacuum means such as that produced by high pressure water, steam or air. The products chlorine dioxide and chlorine in admixture with water vapor, may be further processed after removal from the system by absorbing the chlorine dioxide and chlorine in water in a series of absorption towers. As the crystalline mixture of neutral sodium sulfate and acid sodium sulfate settle out of the generator solution, they are withdrawn from the generator-evaporator-crystallizer in the form of a slurry, passed to an external crystal separator wherein the crystals are removed by any technique known to the art such as by centrifuging, filtering, or other solid liquid separation techniques. Wash water may be passed through the crystal separator to wash the removed crystals. The mother liquor from the crystal separator is returned to the generator.

While any type of equipment may be used to evacuate the single vessel generator-evaporator-crystallizer, a water jet eductor may be advantageously used in which water serves to produce the necessary vacuum, condense the water vapor evaporated from the reaction solution, and dissolve the chlorine dioxide and chlorine produced by the reaction.

The chlorate and chloride containing reactant solution is continuously introduced into the generator-evaporator-crystallizer as an aqueous solution containing any desired ratio of the two reactants, or as separate solutions of the two reactants. The chloride to chlorate ratio influences the ratio of chlorine dioxide/chlorine evolved.

A separate stream of sulfuric acid of any desired concentration, including concentrations above 100%, that is, solutions containing dissolved $SO_3$ in sulfuric acid, is also continuously added to the generator-evaporator-crystallizer vessel. The composition of the solution in the single vessel may be varied over a wide range of chlorate concentration and chloride concentration while maintaining the average acidity during operation within the limits of 3–6 normal and preferably from above 4 to 5 normal.

Sufficient water is evaporated from the reaction solution to form a saturated solution with respect to the sulfate salts, thereby causing crystallization in the vessel. The alkali metal salts are withdrawn from the vessel periodically or continuously, and the chlorine dioxide and chlorine evolved, together with water vapor are also withdrawn from the vessel.

A chloride to chlorate ratio in the feed solutions is chosen to give the desired ratio of $ClO_2/Cl_2$. The molar ratio of chloride to chlorate in the feed solutions to the combination generator-evaporator-crystallizer may be varied over a wide range. From a practical point of view it generally will be between about 1:1 to 6:1 chloride to chlorate. Depending upon the activity of the reaction solution in the combination generator-evaporator-crystallizer and the temperature of the reaction solution, the use of feed solutions wherein the molar of chloride to chlorate is close to 1:1 or 6:1 may lead to the precipitation of sodium chloride respectively, which will be recovered along with the mixed $Na_2SO_4$-$NaHSO_4$ salts. This can be avoided by altering the composition of the feed solutions so that the molar ratio of chloride to chlorate is closer to the center of the range of 1.0:1 to 6:1. For the production of chlorine dioxide, the use of feed solutions having a molar ratio of the order of from 1.05:1 to 1.3:1 is preferred. The rates at which the chlorate, chloride and $H_2SO_4$ are fed to the vessel are then chosen to give the desired average normality. Acidity and temperature are chosen so as to obtain the desired salt mixture ratio and the desired production rate of this salt as well as $ClO_2$ and $Cl_2$. In this method of operation, the concentrations of chloride and chlorate in the reaction solution are dependent variables and, under operating conditions, adjust themselves to the levels required by other vessel operating conditions.

To adjust the contents of the generator-evaporator-crystallizer to the desired temperature, the degree of vacuum applied to the generator-evaporator-crystallizer is adjusted until the reaction solution will be at its boiling point when at the desired temperature, and the rate of heat input into the generator-evaporator-crystallizer is adjusted to raise the temperature of the reaction to the boiling point and to evaporate water at a rate sufficient to maintain a substantially constant volume of liquid in the generator-evaporator-crystallizer.

The evaporation of water at the aforementioned rate causes the formation of the desired crystalline product mixture in the reaction solution in the generator-evaporator-crystallizer. The rate of total energy input into the system from all sources after continuous operating conditions have been reached is such that all of the water being added to the system and being formed by the reactions taking place therein is evaporated from the reaction solution in the generator-evaporator-crystallizer and withdrawn as water vapor from the system.

This process presupposes the return to the generator-evaporator-crystallizer of substantially all of the liquid removed from the generator-evaporator-crystallizer as a slurry of sulfate salt from which the solid crystalline phase is separated. If substantially all of this liquid effluent is not returned to the generator-evaporator-crystallizer, the rate at which water is required to be evaporated therein will be reduced by the rate at which it is being removed from the system through the crystal separator. Operating the process in the latter manner generally is undesirable because chlorate, chloride and sulphuric acid is lost from the system, increasing the cost of operation.

By choosing suitable conditions of temperature, acidity, and concentration of sodium chlorate or sodium chloride in the reacting solution, the solid phase which crystallizes out may be $NaHSO_4$, $Na_3H(SO_4)_2$ or $Na_2SO_4$, or mixtures of these. The crystals may be removed from the generator-evaporator-cystallizer as a slurry, separated from the liquor by filtration, by centrifuging or by other means, washed with water if desired and the liquor returned to the generator-evaporator-crystallizer.

Since no substantial amount of the liquid effluent from the combination generator-evaporator-crystallizer need be removed from the system, the concentration of acid, chlorate or chloride in the reacting solution may be quite accurately controlled without substantial loss of these unreacted substances from the system.

It should be understood that chlorates and chlorides other than sodium chlorate and sodium chloride may be employed. Thus, potassium and lithium chlorates and chlorides may be used. Mixtures of these salts may be employed, if desired.

The reactions taking place in the generator are extremely complex and are influenced by many factors. In the generator there are sodium ions, chlorate ions, chloride ions, sulfate ions, bisulfate ions, hydrogen ions, water, chlorine dioxide, and chlorine. Additionally, there may be chloric, chlorous, and hypochlorous ions and, as is shown, e.g., by U.S. Pat. 2,936,219, there may be chlorite and hypochlorite ions. The concentration of these ions, the temperature of the reaction mixture, the relative rates of the many reactions going on, the acidity of the reaction mixture, the concentration of the catalyst present—all of these factors influence the system and the results obtainable therefrom.

In one of applicants' more preferred embodiments, the average acidity of the system is maintained at less than 6 normal, preferably from about 4.1 to about 5 normal. It has been discovered that, in this embodiment the ratio of sodium sulfate to sodium bisulfate is most variable, permitting the production of a mixed salt product, on demand, which contains the desired Na:S mole ratio between the value of 1.85:1 to 1.20:1, which for practical purposes covers the fluctuation in the range of Na:S demand values for the kraft pulping process.

When the aforementioned preferred embodiment is practiced, it is preferred that the temperature of the reaction mixture be maintained at from about 65 to about 85 degrees centigrade, although a reaction temperature of from about 70 to about 80 degrees centigrade is even more preferred. It is preferred that the system be maintained under a pressure of about 100 to about 400 millimeters of mercury, absolute, although it is more preferred that the pressure be from about 100 to about 300 millimeters of mercury absolute. It is preferred that the acid normality of the system be maintained at from above 4 to about 6, although it is even more preferred to maintain a normality of from above 4 to about 5. It is preferred to maintain the chloride ion molarity at from about 0.5 to about 2.0, the chlorate ion molarity at from about 0.5 to about 2.0, and the molar ratio of chloride/chlorate at from about 1 to 1.3.

Applicants' process is conducted in the presence of a catalyst selected from the group consisting of silver ions, manganese ions, dichromate ions, arsenic ions, and vanadium pentoxide.

Silver ion is the most preferred catalyst. From about 0.0001 to about 1.5 grams of silver ion per liter of reaction solution should be used. Although more than about 1.5 grams of silver ion may be used, one does not obtain significant increased efficiency with the excess amount of said ion.

Manganous ion is one of the preferred catalysts. From about 0.001 to about 4 grams of manganous ion per liter of reaction solution should be used; again, although one may use more than 4 grams of manganous ion per liter of reaction solution, one does not obtain any significant increased efficiency due to the use of the excess amount of said ion.

Dichromate ion, esepecially in the form of alkali metal dichromate such as sodium and potassium dichromate, is another one of the preferred catalysts. It should be used at concentrations of from about 0.5 to about 25 grams per liter, it again being understood that one can use more than 25 grams per liter if so desired.

Arsenic ion and vanadium pentoxide are also preferred catalysts. They, when used, should be in a concentration of from about 0.5 to about 25 grams per liter.

Figure 2:
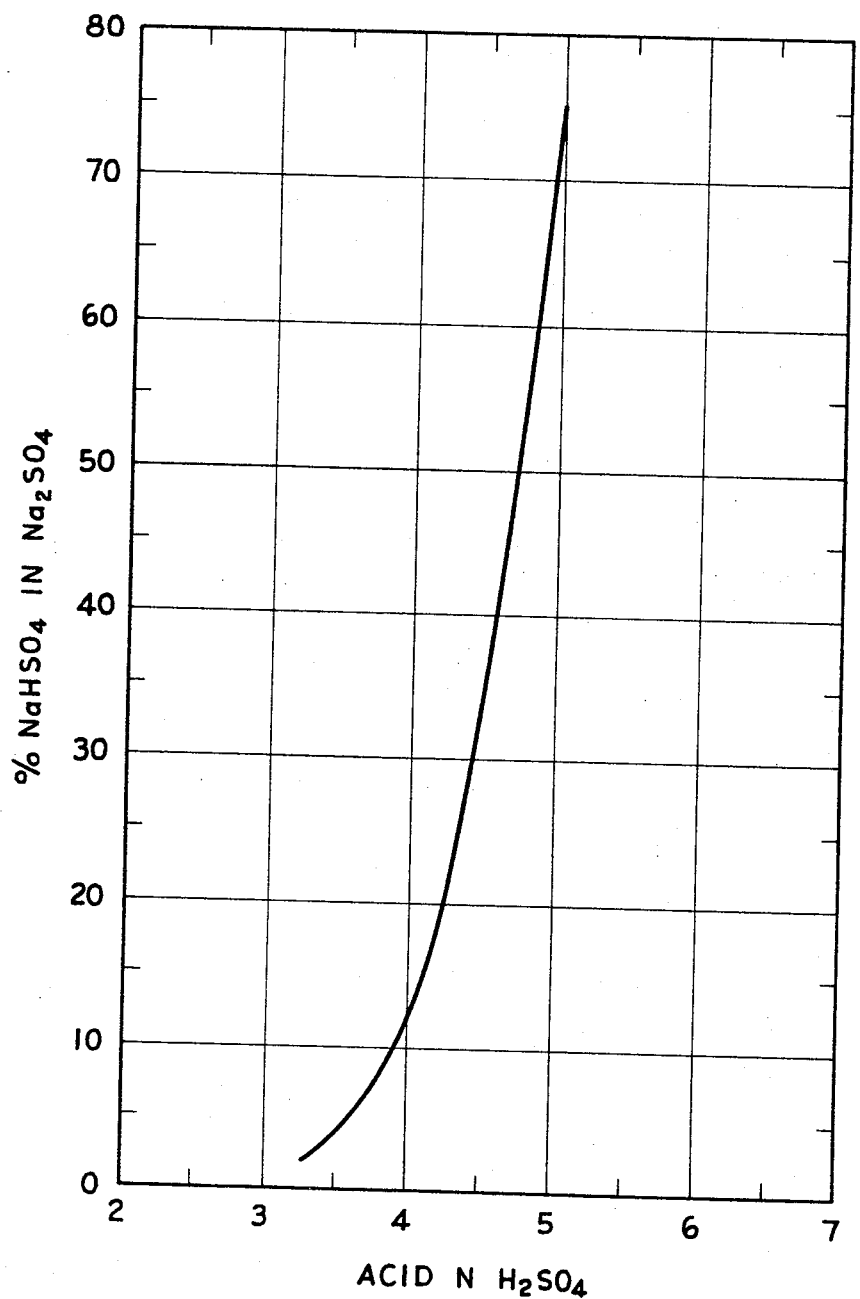

The integration of the instant invention with a kraft pulp process may be best understood by reference to the accompanying drawings in which:

FIG. 1 presents a flow sheet indicating the various steps involved in kraft pulp preparation and bleaching; and FIG. 2 presents a graphical representation of the region of sulfate salt transition from neutral to acid sodium sulfate as a function of the normality of the reaction solution.

In FIG. 1, the reactants, sodium chlorate, sodium chloride, sulfuric acid and catalyst are fed to the generator-evaporator-crystallizer 10 in which chlorine dioxide and chlorine are generated and withdrawn with water vapor via line 41. The generator-evaporator-crystallizer 10 is maintained under vacuum by a vacuum pump (not shown) which is preferably a water jet eductor, the crystalline mixture of $Na_2SO_4$ and $NaHSO_4$ is removed from generator-evaporator-crystallizer 10 and fed to the chemical recovery system 26 via line 48. The gaseous products $ClO_2$ and $Cl_2$ are cooled and the bulk of the $ClO_2$ and some of the $Cl_2$ is absorbed in water in absorber 12 and the resulting $ClO_2$ solution is fed via line 42 to each bleach stage calling for chlorine dioxide. The remaining gas, comprising primarily $Cl_2$, and some inert gas, is fed via line 44 to absorber 14 from which the aqueous chlorine solution is fed via line 46 to the chlorination stage 16.

In the example presented, the bleach stages are:

C—chlorination—stage 16
E—caustic extraction—stages 18 and 22; and
D—chlorine dioxide—stages 20 and 24.

However, it is to be understood that the instant invention is not limited to any specific bleach sequence, but may be combined in any bleaching process for kraft pulp which utilizes $ClO_2$ as a bleaching agent.

The bleached pulp is washed 32, 34, 36, 38 and 40 between each bleach stage in the multi-stage bleach sequence, and is passed from stage to stage via 50, 52, 54 and 56, emerging for wash step 40 as bleached pulp.

The wood pulp is produced in digester 28 and cooled. The resulting slurry is passed via line 60 to washer 30 and the washed pulp is introduced into the first stage 16 of the multi-stage bleach process 16, 18, 20, 22 and 24. The dilute bleach liquor removed by washing at 30 is passed via 62 to the chemical recovery system 26, which includes evaporators, a furnace, in which organic matter is oxidized and sodium sulfate and bisulfate are reduced to a molten mixture of sodium sulfide and sodium carbonate, a smelt dissolving tank, recausticizing stage, clarifiers and filters. The reconstituted aqueous solution of sodium sulfide and sodium hydroxide is fed via line 58 as white liquor (cooking liquor) to digester 28 for further treatment of wood pulp.

Applicants have found, that through the integration of the instant invention into a kraft pulp bleaching operation, the formerly taught three vessel system (separate generator, evaporator and crystallizer) and the attendant piping, all of which were special equipment to provide protection from extensive corrosion by $H_2SO_4$ may be dispensed with by use of the single vessel chlorine dioxide generator-evaporator-crystallizer process and that the $H_2SO_4$ effluent from the formerly taught equipment can be completely contained and utilized to produce desired products, the only loss of acid values from the $ClO_2$ production being that desired loss in the formation of $NaHSO_4$ to regulate the Na:S ratio desired elsewhere in the pulping process. Furthermore, the operation of the single vessel chlorine dioxide process is operable at much lower chlorate concentrations than was formerly considered to be optimum for process efficiency. Inasmuch as the concentration of chlorate in the system affects the rate of chlorine dioxide production, the rate of Reaction 1, supra, being dependent upon said concentration, prior art processes have worked at or near the saturation point of chlorate, thereby creating the possibility that the whole reaction mixture may solidify. Applicants are able to avoid this danger by working at a lower chlorate concentration without any loss in efficiency.

The aforementioned results are rather surprising. As has been indicated hereinbefore, even without a catalyst the aforementioned reaction mixture is very complex, being affected by many factors. When a catalyst is introduced into the mixture an infinitely more complex system is created, for now there is one additional component present which affects the reaction rates of some or all of the competing reactions taking place. Sodium sulfate and sodium acid sulfate crystallization, even in a system wherein relatively few components are present, is a very complex phenomenon which may not be predicted, e.g., merely on the basis of phase diagrams. It was impossible to predict, prior to the instant invention, that a mixture of sodium sulfate and sodium acid sulfate could be precipitated from the extraordinarily complex system formed in a chlorine dioxide generator under the conditions of acidity between about 5 to over 4 normal. Applicants have discovered that, in their most preferred embodiment, sodium sulfate and sodium acid sulfate does precipitate, Reaction 1 predominates and the formation of chlorine is suppressed, and a high yield of the desired chlorine dioxide is obtained from a reaction which goes at a relatively high rate with controllable Na:S values being recoverable from the salt crystallized from the generator-evaporator-crystallizer vessel.

In order to illustrate one of the more preferred embodiments of applicants' invention, the following example which is not to be construed as limiting applicants' invention, is presented.

EXAMPLE 1

To a single vessel generator, as hereinbefore described, were fed sodium chlorate, sodium chloride, and an aqueous solution of 50% sulfuric acid at a rate such that the average concentrations of the chlorate and chloride in the generator were 2.0 and 1.2 molar, respectively and the average normality of the sulfuric acid was 3.7. The generator was maintained at a temperature of 78 degrees centigrade at a pressure of 200 millimeters of mercury absolute. The volume of the reaction mixture was maintained at a constant level by boiling out all of the excess water added with the feed solutions. Anhydrous sodium sulfate crystallized from the solution and was removed from the system.

The reaction was run for 48 hours.

In this period a total of 4750 gms. of sodium chlorate and 4120 gms. of sodium chloride were fed to the generator. This produced a total of 2580 gms. of chlorine dioxide and 2790 gms. of chlorine. The yield of chlorine dioxide based on consumed sodium chlorate was 83.5%.

This same generator was then emptied and recharged with a solution containing sodium dichromate. As before it was operated at 78 degrees centigrade and 200 mm. Hg pressure. An aqueous solution of 3.2 M sodium chlorate and 3.36 M sodium chloride was fed continuously along with an aqueous solution of 50% sulfuric acid.

In one 7 hour period, after reaching continuous operating conditions, the generator solution had the following average concentrations: 0.2 M $Na_2Cr_2O_7$, 3.8 N $H_2SO_4$, 0.98 M $NaClO_3$, 0.80 M NaCl. In this period a total of 545 grams sodium chlorate, 314 grams sodium chloride and 357 grams sulfuric acid were fed to the generator. This produced a total of 187 grams of chlorine dioxide and 130 grams of chlorine. The yield of chlorine dioxide based on consumed sodium chlorate was 95 percent.

When other catalysts, such as silver nitrate, manganous chloride, vanadium pentoxide, and arsenic ion are used, good results are also obtained.

EXAMPLE 2

The procedure of Example 1 was essentially followed with the exception that 1.114 grams per liter of silver nitrate were initially charged as the catalyst. Even after about 10,000 grams of chlorine dioxide had been produced (at an efficiency of about 43 gram atom percent) there was no indication of catalyst weakening. The unexpected and beneficial results of applicants process are evidenced by the fact that when no catalyst was used a gram atom efficiency of only about 33 percent was obtained. When concentrations of silver nitrate of 0.0057 gram per liter were used, essentially the same results were obtained.

EXAMPLE 3

The procedure of Example 1 was essentially followed with the exception that manganese chloride was used as the catalyst. When 2.7 grams per liter of manganese chloride were used a gram atom percent efficiency of 43 percent was obtained.

When other catalysts and/or the same catalysts at different concentrations are used, good results are also obtained. Thus, e.g., good results are obtained with silver nitrate catalyst at a concentration of 0.0001 gram of silver ion per liter. Thus, e.g., good results are obtained with a concentration of 0.001 gram of manganese ion per liter. Thus, e.g. good results are obtained with a concentration of 0.5 gram per liter of dichromate ion, arsenic ion or vanadium pentoxide.

EXAMPLE 4

The procedure of Example 2 is followed with the exception that the average acid normality of the reaction solution is maintained as closely as possible to 4.2. The mixture of $Na_2SO_4$ crystallized in the generator-evaporator-crystallizer is removed and analyzed to determine the amount of $NaHSO_4$ in the product. The $NaHSO_4$ constitutes approximately 20 percent of the salt product, presenting a mixed feed material of $Na_2SO_4$ and $NaHSO_4$ for the cooking liquor of a kraft pulp mill having a Na:S ratio of 1.8:1.

EXAMPLE 5

The procedure of Example 4 is followed, with the exception that the average acid normality of the reaction solution as the single vessel generator-evaporator-crystallizer is held as close as possible to 4.5. The recovered crystalline material contains approximately 37 percent $NaHSO_4$, presenting a mixed feed material of $Na_2SO_4$ and $NaHSO_4$ for the cooling liquor of a kraft pulp mill having a Na:S ratio of 1.63:1.

EXAMPLE 6

The procedure of Example 4 is followed except that the average acid normality is maintained as close as possible to 5.0. The recovered crystalline material contains approximately 75 percent $NaHSO_4$, presenting a mixed feed material of $Na_2SO_4$ and $NaHSO_4$ for the cooking liquor of a kraft pulp mill having a Na:S ratio of 1.2:1.

What is claimed is:

1. A process for the production of a mixture of an alkali metal sulfate and an alkali metal bisulfate which comprises continuously introducing into a single vessel generator-evaporator-crystallizer, and reacting an alkali metal chlorate and an alkali metal chloride with a strong acid selected from the group consisting of sulfuric acid, a mixture of sulfuric acid and HCl and a mixture of sulfuric acid and $H_3PO_4$, in the presence of at least one catalyst selected from the group consisting of vanadium pentoxide, silver ions, manganese ions, dichromate ions and arsenic ions; at an average acid normality from above 4 to about 6 at a temperature between about 65 to 85 degrees centigrade and pressure of from about 100 to 400 millimeters mercury absolute to effect evaporation of water vapor in an amount sufficient to maintain a substantially constant reaction solution volume and to precipitate from said aqueous solution a crystalline mixture of an alkali metal sulfate and an alkali metal bisulfate, removing said water vapor from the single vessel generator-evaporator-crystallizer in conjunction with chlorine dioxide and chlorine and withdrawing said crystalline mixture from said single vessel.

2. The process of claim 1 in which the concentration of said alkali metal chlorate and said alkali metal chloride is maintained between about 0.5–2.5 moles per liter of solution.

3. The process of claim 1 in which the molar ratio of chloride to chlorate in the reaction solution is from about 1 to about 1.3.

4. The process of claim 1 in which the average acid normality of the reaction solution is maintained between 4–5.

5. The process of claim 1 in which the strong acid is sulfuric acid.

6. The process of claim 1 in which the strong acid is a mixture of sulfuric and hydrochloric acid.

7. The process of claim 1 in which said catalyst is a mixture of silver and manganous ions.

8. The process of claim 1 in which from about 0.0001 to about 1.5 grams of silver per liter of reaction solution are used as the catalyst.

9. The process of claim 1 in which from about 0.5 to about 25 grams of dichromate ion per liter of reaction solution are used as the catalyst.

10. The process of claim 1 in which from about 0.001 to about 4 grams of manganous ion per liter of reaction solution are used as the catalyst.

References Cited

UNITED STATES PATENTS

| 1,904,190 | 4/1933 | Becher | 423—478 |
|---|---|---|---|
| 2,654,656 | 10/1953 | Evans | 23—267 |
| 2,736,636 | 2/1956 | Day et al. | 423—479 |
| 2,811,420 | 10/1957 | Pernert | 423—480 |
| 3,056,270 | 10/1962 | Hirschberg | 62—48 |
| 3,341,288 | 9/1967 | Partridge et al. | 423—478 |
| 3,347,628 | 10/1967 | Sepall et al. | 423—480 |
| 3,446,584 | 5/1969 | Fuller | 423—552 X |
| 3,563,702 | 2/1971 | Partridge et al. | 23—152 |

FOREIGN PATENTS

| 1,443,754 | 5/1966 | France. |
|---|---|---|
| 1,443,755 | 5/1966 | France. |
| 1,260,447 | 2/1968 | Germany. |

EDWARD STERN, Primary Examiner

U.S. Cl. X.R.

423—478, 500, 505, 552; 162—22

PO-1050
(5/69)

UNITED STATES PATENT OFFICE
CERTIFICATE OF CORRECTION

Patent No. 3,754,081                     Dated August 21, 1973

Inventor(s)    -   Harold deVere Partridge et al.

It is certified that error appears in the above-identified patent and that said Letters Patent are hereby corrected as shown below:

Column 1, line 25, "about", first occurrence, should read ---above---. Column 4, line 66, "molar of" should read ---molar ratio of---; lines 67 and 68, "of sodium" should read ---of sodium chlorate or sodium---. Column 6, line 4, "embodmient" should read ---embodiment---.

Signed and sealed this 20th day of November 1973.

(SEAL)
Attest:

EDWARD M. FLETCHER, JR.                RENE D. TEGTMEYER
Attesting Officer                      Acting Commissioner of Patents